United States Patent [19]

Amone et al.

[11] Patent Number: 4,978,739

[45] Date of Patent: Dec. 18, 1990

[54] PROCESS FOR PREPARING POLYARYLATE FROM AN ESTER DERIVATIVE OF A DIHYDRIC PHENOL

[75] Inventors: Michael J. Amone, Monmouth Junction; Barry D. Dean, Belle Mead, both of N.J.

[73] Assignee: Amoco Corporation, Chicago, Ill.

[21] Appl. No.: 389,178

[22] Filed: Aug. 3, 1989

[51] Int. Cl.$^5$ ................ C08G 8/02; C08G 63/00; C08G 67/00

[52] U.S. Cl. .................................. 528/271; 528/125; 528/126; 528/171; 528/173; 528/174; 528/176; 528/272

[58] Field of Search ............... 528/176, 271, 125, 126, 528/171, 173, 174

[56] References Cited

U.S. PATENT DOCUMENTS 4,297,475  10/1981  Nelson et al. .................. 528/271

Primary Examiner—Harold D. Anderson
Assistant Examiner—T. Mosley
Attorney, Agent, or Firm—Frederick S. Jerome; William H. magidson; Ralph C. Medhurst

[57] ABSTRACT

An improved diester process is provided for preparing a polyarylate polymer which process comprises reacting at least one aromatic dicarboxylic acid and a diester derivative of a dihydric phenol and an ester-forming agent having no hydrogens alpha to a carbonyl group of the ester-forming agent. Polyarylates produced by the improved process of this invention have a low degree of coloration, melt stability and a low level of haze.

22 Claims, No Drawings

PROCESS FOR PREPARING POLYARYLATE FROM AN ESTER DERIVATIVE OF A DIHYDRIC PHENOL

BACKGROUND OF THE INVENTION

This invention relates to an improved process for preparing an ester derivative of a dihydric phenol by reacting a dihydric phenol with an ester-forming agent to form the corresponding diester and particularly relates to reacting a dihydric phenol with an ester-forming agent having no hydrogens alpha to a carbonyl group of the ester-forming agent. Also, this invention relates to an improved diester process for preparing polyarylate polymers from such a diester derivative of a dihydric phenol. Polyarylates produced by the improved process of this invention have a low degree of coloration, good melt stability and a low level of haze.

Polyarylates are polyesters derived from a dihydric phenol, such as 2,2-bis(4-hydroxyphenyl)propane, also identified as bisphenol-A, and an aromatic dicarboxylic acid, particularly mixtures of terephthalic and isophthalic acids. These polyarylates are high temperature, high performance thermoplastic polymers which have a good combination of thermal and mechanical properties. They also have good processability which allows them to be molded into a variety of articles.

Polyarylates can be prepared by any of the well-known prior art polyester-forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

Many processes have been described in the literature for the preparation of polyarylates. One such process is the diacetate process. In the diacetate process, a dihydric phenol is converted to its diacetate derivative, which is then reacted with one or more aromatic dicarboxylic acid(s) to form a polyarylate. As pointed out in U.S. Pat. No. 4,294,956, light yellow polyarylates can be produced by carrying out this process in a suitable concentration of an appropriate solvent such as diphenyl ether. However, it is desirable to produce polyarylates of even lower color.

The use of high purity, low color diester derivatives of a dihydric phenol monomer is also important in making a low color, stable polyarylate polymer. Conventionally, the purification of such monomers included dissolving the monomers in a suitable solvent, usually with an adsorbent such as activated charcoal, and recrystallizing the product from the solvent. However, such a purification process is complex and uneconomical due to the dissolution and crystallization steps and the large amount of solvent involved.

U.S. Pat. No. 4,075,173 issued Feb. 21, 1978, assigned to Sumitomo Chemical Company, Limited, Osaka, Japan, describes the preparation of copolyesters by reacting an aromatic dicarboxylic acid, a diacetate of Bisphenol-A, and an acetate of p-hydroxybenzoic acid. Various processes for producing polyarylates by the reaction of Bisphenol-A and terephthalic and isophthalic acids are reviewed in this patent. The following process for producing polyarylates, identified as route (1), is described in column 2 of the patent:

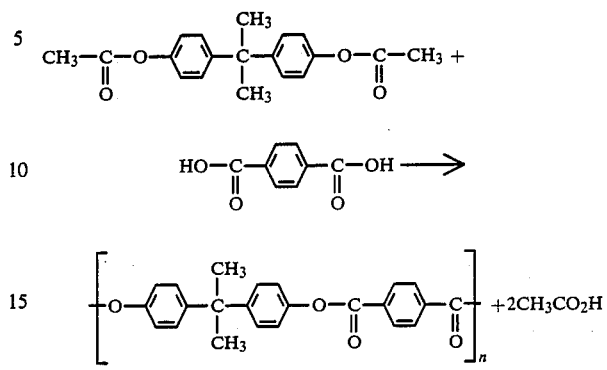

This process is the diacetate process as described herein, or the "Acetate Process" as defined in the patent.

Column 2 of the patent states:

"The route (1) is not desirable because the undesirable coloration and deterioration of polymer are particularly remarkable as disclosed in the above-mentioned literature."

Further, column 3 of the patent states:

"On the other hand, the route (1), Acetate process, is economically advantageous because the materials used are cheap and the operation is simple. For example, diacetate of bisphenol-A, a monomer for Acetate process, is synthesized by merely reacting acetic anhydride and bisphenol-A. Consequently, it may be said that, if the fatal drawbacks of Acetate process, color and deterioration, are solved, Acetate process will become the most superior process."

Thus, the skilled workers in the field of polyarylate chemistry realized that processes for producing polyarylates had one or more deficiencies prior to the priority date of U.S. Pat. No. 4,075,173, and that a need existed to develop a viable diacetate process for producing polyarylates.

The process of said U.S. Pat. No. 4,075,173 requires the use of p-hydroxybenzoic acid and produces a particular class of polyarylate copolymers.

Several methods for producing polyarylates by the diacetate process are described in the following U.S. Patent which are commonly assigned to Amoco Corporation, Chicago, Ill. Specifically, these U.S. Patents describe the following:

Commonly assigned U.S. Pat. No. 4,294,956, issued Oct. 13, 1981 in the name of M. H. Berger, et al. and titled "Process For Preparing Polyarylates in the Presence of a Diphenyl Ether" describes a process for preparing polyarylates having a reduced viscosity of from about 0.5 to greater than 1.0 dl/gm, which process comprises reacting at least one diester derivative of a dihydric phenol with at least one aromatic dicarboxylic acid in the presence of a diphenyl ether compound, at a temperature of from about 260° to about 350° C.

Commonly assigned U.S. Pat. No. 4,294,957, issued Oct. 13, 1981, in the name of M. H. Berger, et al. and titled "Process For Preparing Polyarylates" describes a process for preparing polyarylates of improved color which process comprises reacting a diester derivative of a dihydric phenol with an aromatic dicarboxylic acid in the presence of at least one cycloaliphatic, substituted aromatic or heteroaromatic compound, which compounds contain at least one benzylic and/or tertiary hydrogen atom, at a temperature of from about 260° to about 350° C. Optionally, the process may be carried out in the presence of a magnesium, manganese, or zinc catalyst.

Commonly assigned U.S. Pat. No. 4,296,232, issued Oct. 20, 1981, in the name of L. M. Maresca, et al. and titled "Process For Preparing Polyarylates in the Presence of a Diphenyl Ether Compound and A Catalyst" describes a process for preparing polyarylates which process comprises reacting a diester derivative of a dihydric phenol with an aromatic dicarboxylic acid in the presence of a diphenyl ether compound at a temperature of from about 260° to about 350° C. and in the presence of a magnesium catalyst.

Commonly assigned U.S. Pat. No. 4,321,355, issued Mar. 23, 1982, in the name of L. M. Maresca, et al. and titled "Process For Preparing Polyarylates" describes a process for preparing polyarylates by a process requiring an additional process step in which prior to reacting a diester derivative of a dihydric phenol with an aromatic dicarboxylic acid the residual acid anhydride is removed from the diester derivative of the dihydric phenol so that its concentration is less than about 1500 parts per million.

Commonly assigned U.S. Pat. No. 4,374,239, issued Feb. 15, 1983, in the name of M. H. Berger, et al. and titled "Process For Preparing Polyarylates" describes a process for preparing polyarylates by a process requiring an additional process step in which prior to reacting a diester derivative of a dihydric phenol with an aromatic dicarboxylic acid the residual acid anhydride is removed from the diester derivative of the dihydric phenol so that its concentration is less than about 1500 parts per million.

Commonly assigned U.S. Pat. No. 4,374,239, issued Feb. 15, 1983, in the name of M. H. Berger, et al. and titled "Process For Preparing Polyarylates" describes a process for preparing polyarylates which process comprises reacting a diester derivative of a dihydric phenol with an aromatic dicarboxylic acid in the presence of at least one halogenated and/or etherated substituted aromatic or heteroaromatic compound, at a temperature of from about 260° to about 350° C.

However, the polyarylates produced by the diacetate processes described in U.S. Pat. Nos. 4,296,232; 4,294,956; 4,294,957; 4,321,355 and 4,374,239, supra, still tend to contain colored species to an unacceptable extent for some end uses and tend to be melt unstable if there is too much unreacted anhydride in the dihydric phenol diester composition prior to polymerization. Thus, the polyarylate must be prepared from a purified intermediate dihydric phenol diester, or it is difficult to fabricate. Also, without purification of the diester, the polyarylate may not be acceptable in applications where polyarylates which are low in color are required.

Because use of high color, low purity diester derivatives of a dihyric phenol monomer leads to undesirable properties in polyarylate polymers made therefrom by the diester process, and due to difficulties in conventional methods for purification of the monomers, it is desirable to avoid formation of color body-containing by-products in the formation of the diester. A process which permits formation of diester derivative of a dihydric phenol monomer having, simultaneously, low color and high purity would be useful. A process which permits both without any additional process steps and without an increase in haze or loss in melt stability of polyarylates made therefrom would be very advantageous.

This invention is directed to an improved process for preparing polyarylates which are melt stable, low in color, and low in haze.

The improved diester process of this invention provides a method to prevent formation of undesirable by-products in preparing a diester derivative of a dihydric phenol. For example, in the well-known diacetate process, such extended, conjugated by-products as alpha, beta-unsaturated ketone may be formed by the acylation/Aldol condensation reaction of acylated bisphenol-A-diacetate which introduces a color body into the polyarylate polymer that is difficult to remove.

SUMMARY OF THE INVENTION

A polyarylate polymer having a low degree of coloration and other desirable properties is provided by an improved diester process which process comprises reacting at least one aromatic dicarboxylic acid and a diester derivative of a dihydric phenol and an ester-forming agent having no hydrogens alpha to any carbonyl group of the ester-forming agent. It is believed that the use of an ester-forming agent without a removable hydrogen alpha to a carbonyl group avoids formation of the enol form and thus prevents Aldol-type condensation reactions of the diester which can produce undesirable and difficult to separate colored by-products in the esterification.

BRIEF DESCRIPTION OF THE INVENTION

This invention is an improved method to prepare polyarylate polymers by a diester process. The polyarylate polymers produced by the novel process of this invention are melt stable and have low color and low haze.

More particularly, this invention is a diester process for preparing a polyarylate polymer, which process comprises the steps (a) preparing a diester derivative of a dihydric phenol by reacting at least one dihydric phenol with an ester-forming agent selected from the group consisting of monocarboxylic acid compounds containing no hydrogen atoms on the carbon atom in the position alpha to the carbonyl group of the monocarboxylic acid compound and (b) reacting the diester with at least one aromatic dicarboxylic acid at a temperature sufficient to form the polyarylate.

In somewhat greater detail, this invention is a diester process for preparing a polyarylate polymer comprising the steps:

(a) reacting at least one dihydric phenol with an ester-forming agent selected from the group consisting of tri-alpha monocarboxylic acid compounds comprising the formula

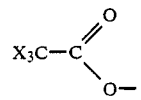

where X are independently selected from the group consisting of halogens and alkyl groups having 1 to 6 carbon atoms to form the corresponding diester; and
(b) reacting said diester with at least one aromatic dicarboxylic acid at a temperature sufficient to form the polyarylate.

Polyarylates which can be produced by the novel diester process of this invention have an inherent viscosity of from about 0.3 to greater than about 1.0 dL/gm, preferably from about 0.4 to about 0.8 dL/gm, as measured in phenol/tetrachloroethane (60/40) or other suitable solvent at 25° C.

Any dihydric phenol well known to the those skilled in the art may be used herein. Dihydric phenols may be used individually or in combination. Particularly useful are dihydric phenols having the following formula

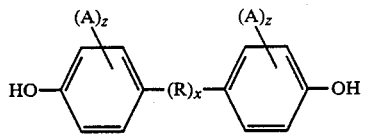

wherein A is independently selected from the group consisting of alkyl groups having 1 to 4 carbon atoms, chlorine or bromine, z is independently an integer from 0 to 4, inclusive, R is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4'-(dihydroxyphenyl)ether
4,4'-(dihydroxyphenyl)sulfide,
4,4'-(dihydroxyphenyl)sulfone,
4,4'-dihydroxybiphenyl,
1,1-bis-(4-hydroxyphenyl)phenylethane,
4,4'-(dihydroxyphenyl)sulfoxide,
4,4'-(dihydroxybenzophenone),
hydroquinone, and
naphthalene diols.

Any ester-forming agent is suitable for use herein provided the ester-forming agent has no hydrogens alpha to a carbonyl group. Suitable ester-forming agents include alpha substituted monocarboxylic acid compounds, preferably, alpha, alpha, alpha, tri-substituted acetic acid compounds. Preferred ester-forming agents comprise the formula

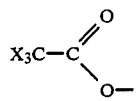

where X are independently selected from the group consisting of halogens, more preferably fluorine, chlorine and bromine, most preferably fluorine, and alkyl groups having 1 to 6 carbon atoms, more preferably methyl groups.

Preferred ester-forming agents include acid anhydrides having the formula

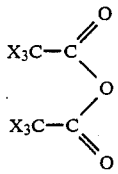

where X are independently selected from the group consisting of halogens, more preferably fluorine, chlorine and bromine, most preferably fluorine, and alkyl groups having 1 to 6 carbon atoms, more preferably methyl groups.

In a preferred embodiment of the novel process of this invention the ester-forming agent is trifluoroacetic anhydride. In another preferred embodiment of the process of this invention the dihydric phenol is bisphenol-A. In a more preferred embodiment of the improved process of this invention the ester-forming agent is trifluoroacetic anhydride and the dihydric phenol is bisphenol-A.

Dihydric phenol reacts with the ester-forming agent, preferably an acid anhydride, under conventional esterification conditions to form the dihydric phenol diester. Generally, the reaction is carried out using an excess of ester-forming agent, preferably about 25 percent excess of an acid anhydride. The reaction may take place in the presence or absence of a solvent. Additionally, the reaction may be conducted in the presence of a conventional esterification catalyst or in the absence thereof.

Aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferred aromatic acids are isophthalic acid, terephthalic acid and mixtures thereof. When mixtures of isophthalic and terephthalic acids are used, the isophthalic acid to terephthalic acid ratio is in a range from about 1:99 to about 99:1. Preferably, the acid ratio in the mixture is in a range from about 20:80 to about 99:1. The most preferred acid ratio is from about 25:75 to about 75:25. Also, from about 0.5 to about 20 percent of aliphatic diacids containing from 2 to about 10 carbon atoms, such as adipic acid, sebacic acid, and the like may be additionally used in the polymerization reaction. Advantageously in an amorphous (non-crystalline) polyarylate, an amount of a p-hydroxy aromatic acid, e.g., p-hydroxybenzoic acid, may be additionally used in the polymerization reaction to obtain improved properties in the amorphous polyarylate.

The preparation of the polyarylate may be carried out in bulk, preferably neat or in the presence of from about 20 to about 80, preferably from about 30 to about 70, and more preferably from about 40 to about 60 weight percent, based on the weight of the polyarylate produced, of an organic solvent.

The preferred organic solvents are a diphenyl ether compound as described in U.S. Pat. No. 4,294,956, supra, a cycloaliphatic substituted aromatic or heteroaromatic compound, as described in U.S. Pat. No. 4,294,957, supra, and a halogenated and/or etherated substituted aromatic or heteroaromatic compound, as described in U.S. Pat. No. 4,374,239, supra, or mixtures of these.

Amount of solvent(s) employed can vary during the polymerization reaction. For example, it may be advantageous to increase progressively the amount of one or more of these solvents to maintain viscosity of the reaction medium within a limited range.

While it is generally preferred to prepare polyarylates by the process of the present invention without using a catalyst, a catalyst may be used to accelerate the rate of polyarylate formation. All the conventional catalysts capable of accelerating an ester exchange reaction are suitable for use herein. These include metal salts, generally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate produced.

Polyarylate polymer may be prepared in two reaction zones by adding ester-forming agent and dihydric phenol to a first reaction zone and reacting these under esterification conditions described, supra, to form the diester derivative of the dihydric phenol. Typically, dihydric phenol diester is prepared by reacting a dihydric phenol with an acid anhydride at a temperature of from about 120° to about 210° C., preferably from about 130° to about 160° C., for a period of from about 0.5 to about 4 hours and at a pressure of from about 1 to about 3 atmospheres. The process is preferably carried out at a pressure sufficient to have the solvent refluxing at the reaction temperature. Under these conditions conversion to the dihydric phenol diester is at least 99.9 percent. Residual ester-forming agent is then removed by methods known in the art, such as by vacuum distillation, or by chemical reaction with reactants which are not harmful to the polymerization, such as water, alcohols, dihydroxy compounds, and the like. The diester derivative may then be added to a second reaction zone, without any purification. The second reaction zone contains aromatic dicarboxylic acid(s), and optionally solvent and/or catalyst. The polymerization is then carried out. Alternatively, the diester derivative is added to the second reaction zone and aromatic dicarboxylic acid(s), and optionally, solvent and/or catalyst added thereto and the polymerization carried out. Any combination of adding the diester derivative, aromatic dicarboxylic acid(s) and, optionally, solvent and/or catalyst to a reaction vessel, may be used.

In another embodiment of this invention, the diester derivative of the dihydric phenol is prepared in a reaction zone by reacting ester-forming agent and dihydric phenol therein under the esterification conditions described, supra. Residual ester-forming agent is then removed by the procedures described, supra. Aromatic dicarboxylic acid(s) and optionally solvent and/or catalyst is then added to the reaction zone and the polymerization reaction carried out to produce the polyarylate.

Preferably, residual ester-forming agent is removed so that its concentration is less than 1500, more preferably less than about 800, and most preferably less than about 500 parts per million.

Generally, the polymerization process of this invention is carried out at a temperature of from about 260° to about 350° C., preferably from about 275° to about 295° C., under an inert atmosphere (such as argon or nitrogen) so that oxygen content therein is minimized or eliminated. Oxygen content of such an inert atmosphere is generally less than about 100, preferably less than about 30, and most preferably less than about 10 parts per million. The process is preferably carried out at a pressure sufficient to have the solvent refluxing at the reaction temperature. This pressure is generally from about atmospheric to about 11 atmospheres. Lower and higher pressures may also be used.

The polymerization reaction is conducted for a period of time sufficient to produce a polyarylate having an inherent viscosity of at least about 0.3 dL/gm, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired.

The process of this invention produces novel polyarylates which have an inherent viscosity of at least about 0.3, preferably polyarylate polymer has an inherent viscosity in a range from about 0.3 to about 1.0 dL/gm, as measured in phenol/tetrachloroethane (60:40), or other suitable solvent at 25° C.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also be blended with one or more thermoplastic polymers such as polyesters, polycarbonates, styrene polymers, alkyl acrylate polymers, polyurethanes, poly(aryl ether) polymers, polyamides, polyhydroxy ether polymers, copolyetherester block copolymers, polyamides, and the like.

The following examples serve to give specific illustrations of the practice of this invention but they are not intended in any way to limit the scope of this invention.

GENERAL EXPERIMENTAL

All reactions were carried out under a nitrogen atmosphere. Trifluoroacetic anhydride (Aldrich Chemical) and bisphenol-A (Dow Chemical) were used without further purification. All polymerizations were run in a three-necked 250 mL round-bottomed flask equipped with a mechanical stirrer, glass rod and paddle, a claisen head consisting of a thermocouple and a nitrogen inlet, and an offset adapter which had attached to it a collection funnel, condenser, and a nitrogen outlet. The polymerization was run using the same sources of diphenyl ether, which was purified by vacuum distillation, terephthalic acid (Amoco Chemical), isophthalic acid (Amoco Chemical), and bisphenol-A-diacetate (Amoco Chemical) or bisphenol-A-di-trifluoroacetate. Solution absorbance and viscosity measurements were performed in accordance with the following procedures:

INHERENT VISCOSITY(IV): Approximately one gram of polyarylate is dissolved in 100 milliliters of a 60/40 weight/weight phenol/1,1,2,2-tetrachloroethane solution at 25° C. In a solution viscometer the falling time, t(seconds), of the polymer solution is measured against the falling time, $t_0$(seconds), of the phenol/1,1,2,2-tetrachloroethane solution at 25° C. The inherent viscosity (IV) is calculated as follows $$IV=[ln(t/t_0)]/C$$

where C=concentration of the polymer in phenol/1,1,2,2-tetrachloroethane in grams/deciliter.

SOLUTION ABSORBANCE: A 5% by weight solution of polyarylate in methylene chloride is prepared and the ultraviolet absorbance of the solution is measured at 425 nanometers(nm) on a Fischer Electrophotometer II instrument. The ultraviolet absorbance of the methylene chloride blank is also measured at 425 nm. The difference of the UV absorbance between that of the 5% polyarylate solution and the blank is the reported solution absorbance for the polyarylate.

EXAMPLE 1

Monomer Synthesis

Bisphenol-A-di-trifluoroacetate was prepared under a nitrogen atmosphere by reaction of trifluoroacetic anhydride with bisphenol-A and 1-2 drops of pyridine.

To bisphenol-A (46.18 g, 0.2023 moles), under a steady flow of nitrogen, was added 1-2 drops of pyridine and trifluoroacetic anhydride (85.00 g, 0.4046 moles). An additional 19.00 g (0.0941 moles) of trifluoroacetic anhydride was added from an additional funnel over a 1.5-hr period, 2.5 hr after the reaction started. The temperature/time profile followed was; 40° C. (1 hr), 50°-60° C. (1 hr), 70° C (1 hr), 80° C. (1.5 hr), and 95° C. (3 hr). The excess trifluoroacetic anhydride and trifluoroacetic acid were removed under reduced pressure and the crude yellow liquid vacuum distilled through a vigreaux column to give a colorless liquid in an 82% yield (Bp 104°-105° C./0.05 mm); $^1$H NMR (CDCL$_3$, 360 MHz)δ7.28 (4H, d, J=8.67 Hz); 7.12 (4H, d, J=8.67 Hz); 1.69 (6H, s).

EXAMPLE 2 AND COMPARATIVE EXAMPLES A AND B

Polymer Synthesis

Three control polymerization experiments were run at 260°-270° C. under a nitrogen atmosphere in an all-glassware system, using an isophthalic acid to terephthalic acid ratio of 1:1 and using diphenyl ether as the solvent. The diacids were condensed with either bisphenol-A-diacetate, bisphenol-A-diacetate containing 0.3% sodium formate, or bisphenol-A-di-trifluoroacetate to give the three polymers. The three polymers had inherent viscosities of 0.43, 0.41, and 0.57 as well as solution absorbances of 0.53, 0.41, and 0.32, respectively. It is apparent from the analysis of the absorbance data that by utilizing diacetate derivatives of dihydric phenols having no enolizable protons, low color polyarylates can be prepared.

EXAMPLE 2

Polyarylate from Bisphenol-A-di-trifluoroacetate

A 250 mL round-bottomed flask was charged with 45.40 g (0.1080 moles) of bisphenol-A-di-trifluoroacetate, 8.92 g (0.0537 moles) of terephthalic acid, 8.92 g (0.0537 moles) of isophthalic acid, and 40.00 g of diphenyl ether. The system was flushed with nitrogen for 30 minutes and the heating started. Trifluoroacetic acid started to collect at 245° C, 1.0 hr after heating was started, and the polymerization was run for an additional 15 hr at 263°-268° C. The reaction was cooled to 200° C. and 70 mL of chloroform were added dropwise from an addition funnel. The polymeric solution was further diluted upon reaching room temperature. The polymeric solution was coagulated by addition to isopropanol and filtered. The precipitate was dried at 120° C. in a vacuum oven overnight and gave an inherent viscosity of 0.57. The solution absorbance was measured and found to be 0.032.

COMPARATIVE EXAMPLE A

Polyarylate

A 250 mL round-bottomed flask was charged with 60.30 g (0.1930 moles) of bisphenol-A-diacetate, 15.95 g (0.0960 moles) of terephthalic acid, 15.95 g (0.0960 moles) of isophthalic acid, and 70.00 g of diphenyl ether. The system was flushed with nitrogen for 30 minutes and the heating started. Acetic acid started to collect at 250° C. (30 minutes after heating began) and the polymerization was run for an additional 7.5 hr at 260°-265° C. The reaction was cooled to 200° C., then 70 mL of chloroform were added dropwise from an addition funnel. The polymeric solution was further diluted upon reaching ambient temperature. The polymer solution was then coagulated by adding it to a blender containing isopropanol and filtered. The precipitate was dried at 120° C. in a vacuum oven overnight and gave an inherent viscosity of 0.43. The solution absorbance was measured and found to be 0.053.

COMPARATIVE EXAMPLE B

Polyarylate Using Sodium Formate

A 250 mL round-bottomed flask was charged with 60.30 g (0.1930 moles) of bisphenol-A-diacetate, 15.95 g (0.0960 moles) of terephthalic acid, 15.95 g (0.0960 moles) of isophthalic acid 0.2100 g (0.0031 moles) of sodium formate, and 70.00 g of diphenyl ether. The system was flushed with nitrogen for 30 minutes and the heating started. Acetic acid began to collect at 255° C., 0.5 hr after heating began, and the polymerization was run for an additional 7.5 hr at 260°-265° C. The reaction was cooled to 200° C., and then 70 mL of chloroform was added dropwise from an addition funnel. The polymer solution was further diluted upon reaching room temperature and filtered through a bed of celite. The filtrate, polymeric solution, was coagulated by addition to isopropanol and filtered. The precipitate was dried in a vacuum oven at 120° C. overnight and gave an inherent viscosity of 0.41. The solution absorbance was measured and found to be 0.041.

What is claimed is:

1. An improved diester process for preparing a polyarylate polymer which process comprises reacting at least one aromatic dicarboxylic acid and a diester derivative of a dihydric phenol and an ester-forming agent having no hydrogen atoms on a carbon atom in a position alpha to a carbonyl group of the ester-forming agent.

2. A process as defined in claim 1, wherein the ester-forming agent is an alpha, alpha, alpha, tri-substituted acetic acid compound and the polyarylate polymer has an inherent viscosity in a range from about 0.3 to about 1.0 dL/gm measured using approximately one gram of polyarylate dissolved in 100 milliliters of a 60/40 weight/weight phenol/1,1,2,2-tetrachloroethane solution at 25° C.

3. A process as defined in claim 1, wherein the ester-forming agent is a trihaloacetic anhydride and the polyarylate polymer has an inherent viscosity in a range from about 0.3 to about 1.0 dL/gm measured using approximately one gram of polyarylate dissolved in 100 milliliters of a 60/40 weight/weight phenol/1,1,2,2-tetrachloroethane solution at 25° C.

4. A process as defined in claim 1, wherein the ester-forming agent is a trifluoroacetic anhydride and the polyarylate polymer has an inherent viscosity in a range from about 0.3 to about 1.0 dL/gm measured using approximately one gram of polyarylate dissolved in 100 milliliters of a 60/40 weight/weight phenol/1,1,2,2-tetrachloroethane solution at 25° C.

5. An improved diester process for preparing a polyarylate polymer having an inherent viscosity of from about 0.3 to about 1.0 dL/gm measured using approximately one gram of polyarylate dissolved in 100 milliliters of a 60/40 weight/weight phenol/1,1,2,2-tetrachloroethane solution at 25° C., which process comprises the following steps:

(a) reacting at least one dihydric phenol with an ester-forming agent selected from the group consisting of compounds comprising the formula

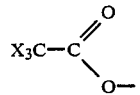

where X are independently selected from the group consisting of halogens and alkyl groups having 1 to 6 carbon atoms to form the corresponding diester; and (b) reacting the diester with at least one aromatic dicarboxylic acid at a temperature sufficient to form the polyarylate.

6. A process as defined in claim 5, wherein each X is a methyl group.

7. A process as defined in claim 5, wherein X is selected from the group consisting of fluorine, chlorine, and bromine.

8. A process as defined in claim 5, wherein the ester-forming agent is trifluoroacetic anhydride.

9. A process as defined in claim 5, wherein the dihydric phenol is of the following formula

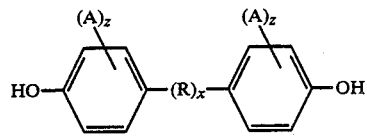

wherein A is independently selected from the group consisting of alkyl groups having 1 to 4 carbon atoms, chlorine or bromine, z is independently an integer from 0 to 4, inclusive, R is independently selected from the group consisting of divalent saturated hydrocarbon radicals having 1 to 8 carbon atoms, a cycloalkylene or cycloalkylidene radical having up to and including 9 carbon atoms, a phenyl radical, O, S, SO, $SO_2$, CO, and x is 0 or 1.

10. A process as defined in claim 5 wherein the dihydric phenol is bisphenol-A and wherein each X is a methyl group.

11. A process as defined in claim 10, wherein the aromatic dicarboxylic acid is selected from isophthalic acid, terephthalic acid, or mixtures thereof.

12. A process as defined in claim 5 wherein the dihydric phenol is bisphenol-A and wherein X is selected from the group consisting of fluorine, chlorine, and bromine.

13. A process as defined in claim 12, wherein the aromatic dicarboxylic acid is selected from isophthalic acid, terephthalic acid, or mixtures thereof.

14. A process as defined in claim 5 wherein the dihydric phenol is bisphenol-A and wherein the ester-forming agent is trifluoroacetic anhydride.

15. A process as defined in claim 14, wherein the aromatic dicarboxylic acid is selected from isophthalic acid, terephthalic acid, or mixtures thereof.

16. A process as defined in claim 5, wherein the diester is reacted with at least one aromatic dicarboxylic acid in the presence of an organic solvent.

17. A process as defined in claim 16, wherein the solvent is selected from the group consisting of a diphenyl ether compound, a cycloaliphatic compound or a substituted aromatic or heteroaromatic compound, or a halogenated substituted aromatic or heteroaromatic compound, or an etherated substituted aromatic or heteroaromatic compound, or a halogenated and etherated substituted aromatic or heteroaromatic compound, or mixtures thereof.

18. A process as defined in claim 16, wherein the solvent is diphenyl ether.

19. A process as defined in claim 16 wherein the solvent is present in an amount of from about 30 to about 70 weight percent, based on the weight of the polyarylate polymer produced.

20. A process as defined in claim 5 wherein the reaction in step (a) is carried out at a temperature in a range from about 120° to about 210° C.

21. A process as defined in claim 5 wherein the reaction in step (b) is carried out at a temperature in a range from about 260° to about 350° C.

22. A process as defined in claim 5, wherein the reaction in step (b) is carried out in the absence of oxygen.

* * * * *